US006367570B1

(12) United States Patent
Long, III et al.

(10) Patent No.: US 6,367,570 B1
(45) Date of Patent: Apr. 9, 2002

(54) HYBRID ELECTRIC VEHICLE WITH ELECTRIC MOTOR PROVIDING STRATEGIC POWER ASSIST TO LOAD BALANCE INTERNAL COMBUSTION ENGINE

(75) Inventors: Alexander J. Long, III, Catharpin; James B. Long, Stafford; Frank J. Samstag, Annandale, all of VA (US)

(73) Assignee: Electromotive Inc., Manassas, VA (US)

( * ) Notice: Subject to any disclaimer, the term of this patent is extended or adjusted under 35 U.S.C. 154(b) by 0 days.

(21) Appl. No.: 09/566,725

(22) Filed: May 9, 2000

Related U.S. Application Data

(63) Continuation of application No. 08/953,516, filed on Oct. 17, 1997, now abandoned.

(51) Int. Cl.$^7$ ................................................ B60K 6/02
(52) U.S. Cl. .......................... 180/65.2; 60/704; 60/705; 180/65.4; 318/376; 701/22
(58) Field of Search .............................. 318/139, 811, 318/376; 60/704, 705; 180/65.2, 65.3, 65.4, 65.8, 65.1; 701/22

(56) References Cited

U.S. PATENT DOCUMENTS

| 3,791,473 A | 2/1974 | Rosen |
| 3,841,428 A | 10/1974 | Bialek |

(List continued on next page.)

FOREIGN PATENT DOCUMENTS

| DE | 39 43 120 A1 | 9/1991 |
| DE | 43 44 053 A1 | 7/1994 |
| EP | 0354790 A2 | 2/1990 |
| EP | 0800946 A2 | 10/1997 |
| JP | 01113571 A | 5/1989 |
| JP | 8028313 A | 1/1996 |
| JP | 8061123 A | 3/1996 |
| WO | WO95/02758 | 1/1995 |

OTHER PUBLICATIONS

Declaration of James B. Long.
Rosen et al., "Batteries Not Included," *Business Week*, Science & Technology Section, (Sep. 23, 1996), pp 78–79.
Electromotive, Inc. Information Bulletin, "A Seamless Electro–Mechanical Vehicle: Presenting a New Powertrain Concept," 2 pages.
Kalberiah, A., "910247 Electric Hybrid Drive Systems for Passenger Cars and Taxis," Volkswagen AG Wolfsburg, Germany, pp 69–78.
Wouk, V., "Hybrid Electric Vehicles," *Scientific American*, Oct. 1997, pp. 70–77.
Internet information, Dept. of Energy Hybrid Vehicle Propulsion Program On–line Resource Center, 6 pages.
Jamieson, et al., "Global Considerations of a Change to an Electric Vehicle Fleet," May 23, 1996, 3 pages.

(List continued on next page.)

Primary Examiner—Michael Mar
(74) Attorney, Agent, or Firm—Nixon & Vanderhye P.C.

(57) ABSTRACT

A parallel hybrid electric vehicle design delivers smooth, high power performance while decreasing harmful exhaust emissions and maximizing fuel economy. An electric motor strategically assists the internal combustion engine. This arrangement can increase driveability and make for a very smooth driving vehicle. Decreased emissions are realized by helping the engine to run in a fashion which inherently minimizes emissions. Fuel economy is significantly enhanced by efficiently producing power needed to make the car meet the demands of the driver while leveling the load demands placed on the internal combustion engine. When the internal combustion engine is operating very efficiently under light loading or deceleration, the power source is charged as the motor turns into a generator.

33 Claims, 10 Drawing Sheets

U.S. PATENT DOCUMENTS

| | | |
|---|---|---|
| 3,842,333 A | 10/1974 | Boese et al. |
| 3,861,484 A | 1/1975 | Joslin |
| 3,886,810 A | 6/1975 | Sugiyama et al. |
| 3,888,325 A | 6/1975 | Reinbeck |
| 3,904,883 A | 9/1975 | Horwinski |
| 3,923,115 A | 12/1975 | Helling |
| 3,970,163 A | 7/1976 | Kinoshita |
| 4,021,677 A | 5/1977 | Rosen et al. |
| 4,042,056 A | 8/1977 | Horwinski |
| 4,090,577 A | 5/1978 | Moore |
| 4,148,192 A | 4/1979 | Cummings |
| 4,165,795 A | 8/1979 | Lynch et al. |
| 4,180,138 A | 12/1979 | Shea |
| 4,252,205 A | 2/1981 | Kronogard |
| 4,267,895 A | 5/1981 | Eggert, Jr. |
| 4,269,280 A | 5/1981 | Rosen |
| 4,305,254 A | 12/1981 | Kawakatsu et al. |
| 4,335,429 A | 6/1982 | Kawakatsu |
| 4,351,405 A | 9/1982 | Fields et al. |
| 4,392,457 A | 7/1983 | Martin |
| 4,400,997 A | 8/1983 | Fiala |
| 4,421,217 A | 12/1983 | Vagias |
| 4,438,342 A | 3/1984 | Kenyon |
| 4,455,492 A | 6/1984 | Guelpa |
| 4,470,476 A | 9/1984 | Hunt |
| 4,499,965 A | 2/1985 | Oetting et al. |
| 4,533,011 A | 8/1985 | Heidemeyer et al. |
| 4,588,040 A | 5/1986 | Albright, Jr. et al. |
| 4,597,463 A | 7/1986 | Barnard |
| 4,697,660 A | 10/1987 | Wu et al. |
| 4,762,191 A | 8/1988 | Hagin et al. |
| 4,779,183 A | 10/1988 | Mutoh et al. |
| 5,125,469 A | 6/1992 | Scott |
| 5,147,003 A | 9/1992 | De Monclin |
| 5,176,213 A | 1/1993 | Kawai et al. |
| 5,193,634 A | 3/1993 | Masut |
| 5,249,637 A | 10/1993 | Heidl et al. |
| 5,251,721 A | 10/1993 | Ortenheim |
| 5,301,764 A | 4/1994 | Gardner |
| 5,318,142 A | 6/1994 | Bates et al. |
| 5,323,868 A | 6/1994 | Kawashima |
| 5,337,848 A | 8/1994 | Bader |
| 5,343,970 A | 9/1994 | Severinsky |
| 5,346,031 A | 9/1994 | Gardner |
| 5,513,718 A | 5/1996 | Suzuki et al. |
| 5,644,200 A | 7/1997 | Yang |
| 5,839,533 A | 11/1998 | Mikami et al. |
| 5,862,497 A | 1/1999 | Yano et al. |
| 5,865,263 A | 2/1999 | Yamaguchi et al. |

OTHER PUBLICATIONS

Sperling, D., "The Case for Electric Vehicles," *Scientific American*, Nov. 1996, pp. 54–59.

Internet Information, "Technical Description of the Rosen Motors Hybrid Electric Powertrain," 3 pages.

Calstart Press Release, "Rosen Motors Corporate Backgrounder," 1996, 3 pages.

Press Release, "Honda joins in developing hybrid–driven cars," Copyright 1997, Kyodo News International, 1 page.

Electromotive, Inc. Press Release, "Breakthrough Engine Technology Brings Gains in Economy, Emissions . . . and Fun!" 1 page.

"Honda Unveils Advanced Technology, Innovations Range From New Brake System to Robot" Dow Jones Newswires, *Wall Street Journal*, Sep. 11, 1997.

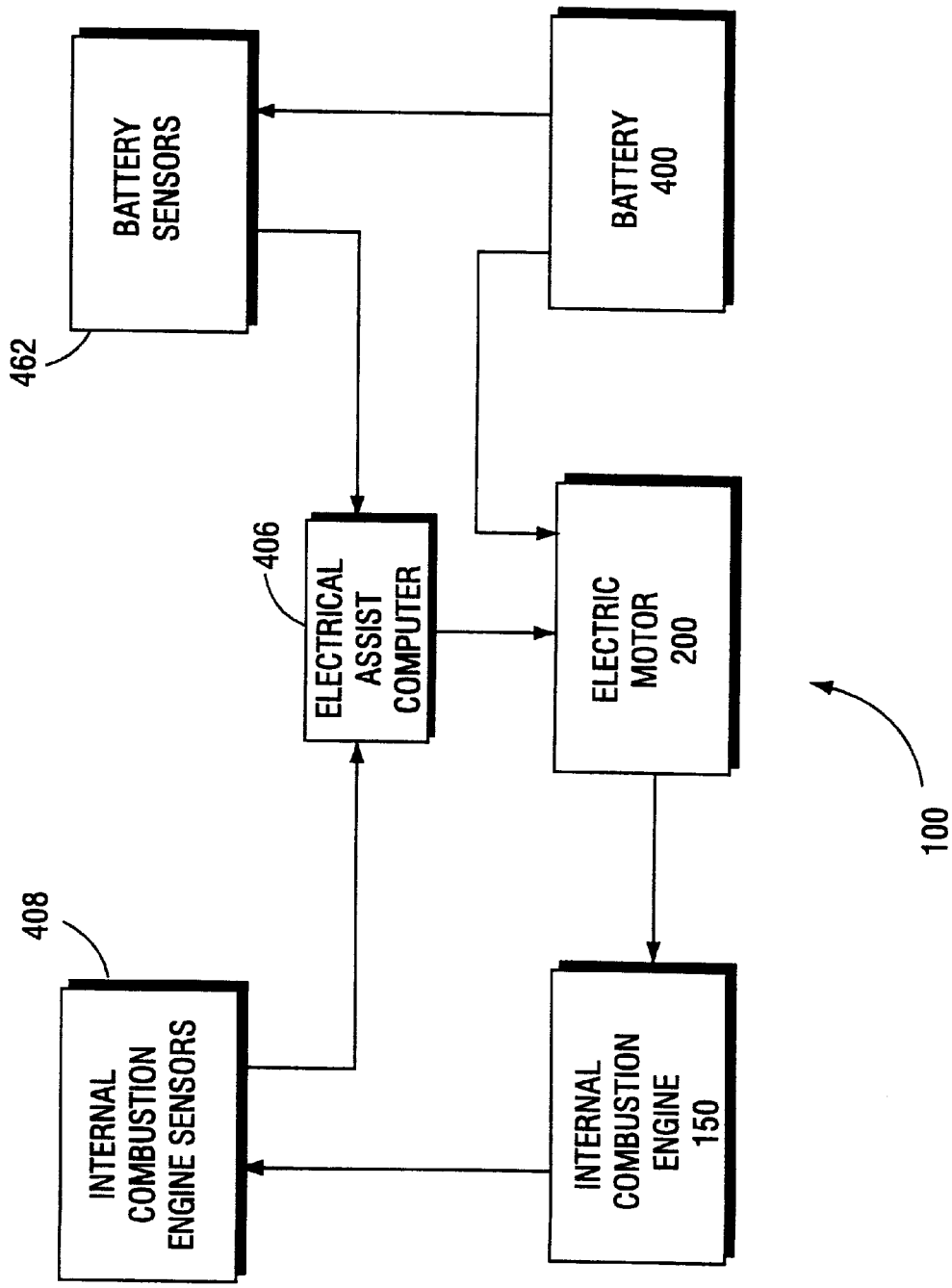

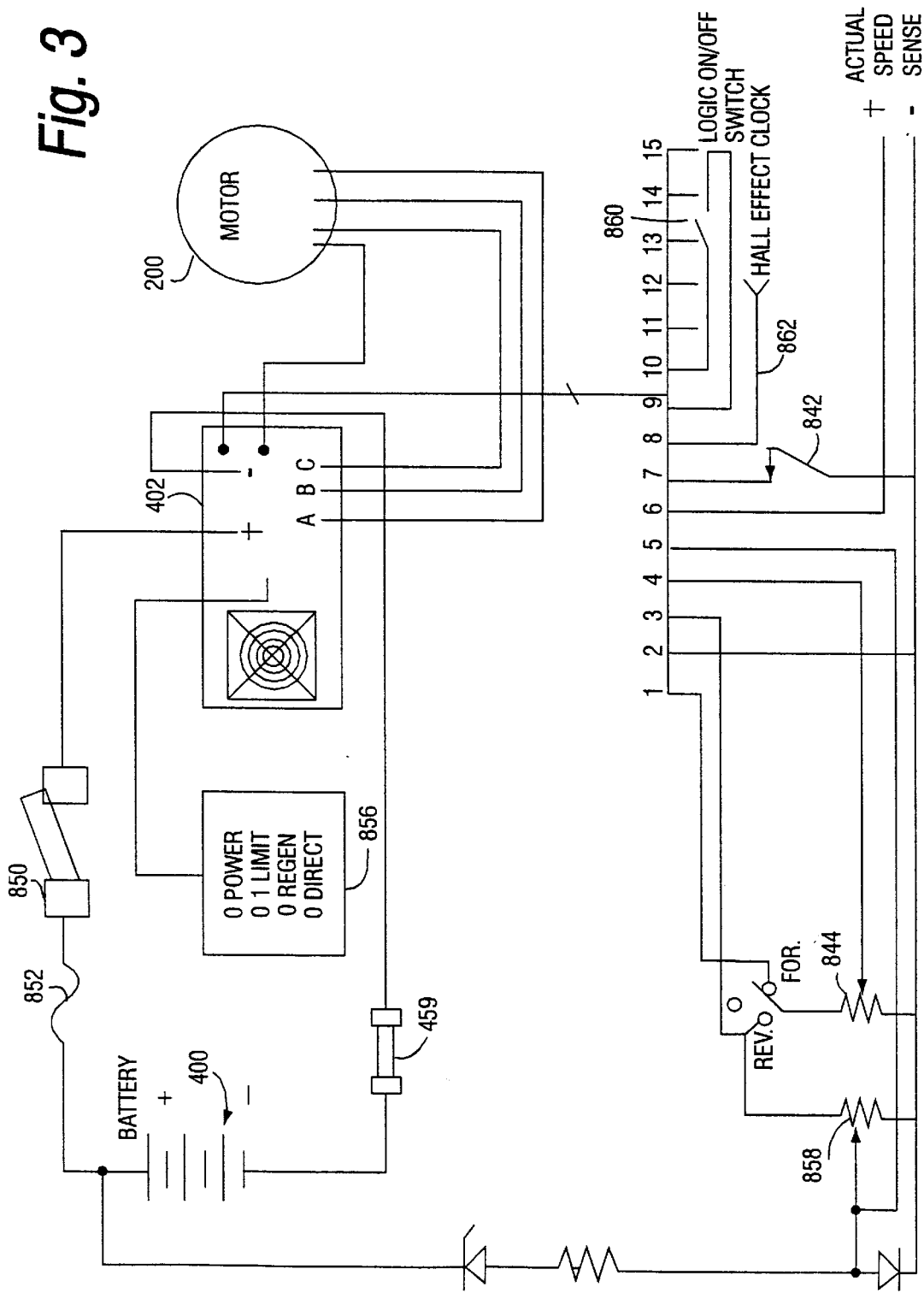

HOT 505 THC AND SPEED VS. TIME
VEHICLE #475/0001 TEST #12853 WITHOUT ELECTRICAL ASSIST

HOT 505 THC AND SPEED VS. TIME
VEHICLE #475/0001 TEST #12854 WITH ELECTRICAL ASSIST

HYBRID ELECTRIC VEHICLE WITH ELECTRIC MOTOR PROVIDING STRATEGIC POWER ASSIST TO LOAD BALANCE INTERNAL COMBUSTION ENGINE

This application is a continuation of Ser. No. 08/953,516, filed Oct. 17, 1997, now abandoned.

FIELD OF THE INVENTION

This invention relates to motor vehicle power plants, and more particularly, to "hybrid" motor vehicles powered by both electrical and fossil fuel power plants. Still more particularly, the present invention relates to a parallel hybrid electric/fossil fuel power plant for a motor vehicle such as a passenger car, in which the electric motor shaft is connected in parallel with an internal combustion engine shaft, and the electric motor is controlled to balance the load of the internal combustion engine.

BACKGROUND AND SUMMARY OF THE INVENTION

For most of the 20th century, the gasoline or diesel powered internal combustion engine has been extremely successful in powering motor vehicles throughout the world. The internal combustion engine efficiently delivers high power outputs by converting fossil fuels such as gasoline into mechanical power. Despite its many advantages, however, the fossil-fuel powered internal combustion engine has some significant drawbacks:

it requires fossil fuels, an expensive, limited resource; and it pollutes the air with poisonous and environmentally damaging combustion byproducts.

These drawbacks are so significant that there has recently been a massive worldwide effort to come up with alternatives.

The all-electric vehicle is one possible alternative. In this all-electric alternative, an electric motor and a source of electric power would replace the internal combustion engine. The electric motor would provide power to drive the wheels, and the electric power source would deliver electricity to drive the motor. An all-electric vehicle has zero exhaust gas emissions and requires no fossil fuels. Widespread use of all-electric vehicles would decrease the economic dependency of major industrialized nations on foreign oil producing countries, and could help us provide cleaner air.

Millions of dollars have been poured into research and development of a practical, commercial all-electric vehicle design that can realize these objectives. Unfortunately, the first practical cost-effective mass-produced all-electric vehicle is still many years away. For the same reasons that the first experimental electric vehicle designs were thrown aside in the last century, all-electric vehicles simply cannot compete with fossil fuel powered vehicles. The problem has to do with efficient power storage.

Because a motor vehicle moves, it must be self-contained and store its own power. Ideally, the power storage should be small, lightweight, and deliver a lot of power. Today's motor vehicles carry two different power storage devices: an electric battery and a gasoline tank. Most of the vehicle's power comes from the gas tank—with the electric battery contributing only enough power to turn a starter motor that gets the internal combustion engine started. Why?

By weight, gasoline stores on the order of fifty times the power versus a battery of the same weight. You would need about a ton of electric batteries to store the same amount of power provided by the gasoline held by the average passenger car fuel tank. Such a large quantity of electric batteries would cost on the order of several thousand dollars, would be very bulky, and may need to be replaced every few years as they wear out.

The batteries also have to be recharged somehow once they become "dead." In today's cars, an alternator converts power from the internal combustion engine into electricity for recharging the battery. If there were no internal combustion engine, the recharging power would have to come from some other source. While some recharging power could come from the force of gravity (for example, the momentum from going down a hill could be converted into electricity), most of the recharging power would have to come from somewhere else—such as an electric wall socket the car owner plugs his car into every night.

This battery recharging process could take many hours or even overnight—as compared with the essentially instant refilling of a passenger car gas tank at a filling station. This means that an all-electric vehicle inherently has a very limited range. The driver would have to stop for the night whenever the batteries discharged too much.

Although many people don't realize it, battery recharging from a wall socket can also cause pollution. The idea that electric power is clean and non-polluting is a fiction. Although some electric power plants (for example, nuclear and hydroelectric power plants) do not pollute the air, the vast majority of electric power plants in the United States burn coal or other combustible materials—and therefore are major polluters. Some people say that an all-electric vehicle would simply move air pollution from individual car exhausts to electric power plant smokestacks.

Major research has been devoted to improving the storage capabilities of electric batteries. Modern batteries are lighter, longer lasting and more powerful than their predecessors from years past. However, the fact remains that filling a gasoline tank is a much more convenient and less expensive way to store power for a high speed, long distance motor vehicle. Human nature being what it is, people are generally reluctant to personally sacrifice a lot of time and money to help the environment. Recycling newspapers is one thing, but spending $15,000 for a car that cannot go on long trips is another thing entirely.

Because battery powered all-electric vehicles cannot compete with vehicles having internal combustion engines, some people have tried to develop so called "hybrid" electric vehicles that use both electric and gasoline power. The basic idea is that a hybrid electric vehicle may provide many of the advantages of both electric and fossil fuel power storage while eliminating at least some of the drawbacks of each. The U.S. Department of Energy has become committed to making hybrid electric vehicles commonplace on American highways by the year 2003. Its National Renewable Energy Laboratory (NREL) is working with industry to develop hybrid vehicles with high fuel economy and low exhaust emissions. The NREL is supporting development programs at General Motors, Ford Motor Company, Chrysler Co., and a variety of independents. Other major automotive manufacturers throughout the world are working on the same problem.

All of this work by all of these different people has led to a number of different hybrid electric approaches. One common approach is the so-called "series" design. The "series" design attempts to solve some of the battery problems discussed above by using an internal combustion engine to generate electrical power. In the "series" design, a fossil-fuel powered internal combustion engine turns the shaft of an electric power generator. The generator's electrical output powers the electric motor. The electric motor is used to turn the vehicle's wheels.

This "series" hybrid design has the advantage of reducing the number and weight of the electric batteries required to power the vehicle. Because the vehicle generates electrical power as it goes, it does not need as many electric batteries and also avoids a long battery recharge time. In addition, the gasoline engine can be operated under essentially constant conditions that can provide low exhaust emissions and low fuel consumption. But this "series" hybrid electric vehicle has some significant drawbacks. Its main drawback is that it is very inefficient in its use of gasoline. The process of converting the mechanical power produced by the gasoline engine into electrical power using a generator for powering the electric traction motor is relatively inefficient. This inefficient process wastes power.

A different approach is the so-called "parallel" hybrid-electric design. In the "parallel" approach, an internal combustion engine and an electric motor can both apply power to a motor vehicle drive train. See, for example, Kalberlah, "Electric Hybrid Drive Systems For Passenger Cars and Taxis", SAE Publication No. 910247 for a survey of various parallel hybrid electric designs. There are many such "parallel" hybrid designs:

- Some such prior "parallel" designs never operate the electric motor and the internal combustion engine in parallel at the same time. Instead, the electric motor is used for city driving and other short trips, while the internal combustion engine is used for longer trips requiring greater range.
- Other parallel hybrid designs use complicated clutches or differentials to couple the engine and the motor to the drive train. Such mechanical linkages are heavy, expensive and can be unreliable.
- Still other parallel hybrid designs drive one pair of wheels with the electric motor and the other pair of wheels with the internal combustion engine. This approach can cause steering and safety problems.

While prior parallel hybrid approaches have met with limited success in the laboratory or on the test track, no practical mass-produced commercially available passenger vehicle has yet been produced using this technology. Further improvements are desperately needed.

Electrical Assist Approach Provided by the Present Invention

The present invention provides a new parallel hybrid electric vehicle design that delivers smooth, high power performance while decreasing harmful exhaust emissions and maximizing fuel economy.

In accordance with an aspect of the present invention, a battery-powered electric motor assists the internal combustion engine. During typical vehicle operation, most of the vehicle's power comes from the internal combustion engine. The electric motor is controlled to output power under certain operating conditions to assist the internal combustion engine. In particular, the electric motor provides a "load leveling" function that improves performance and driveability while maximizing fuel economy and reducing harmful emissions.

In one non-limiting example, a controller can control the electric motor to assist the internal combustion engine during times when the engine is called upon to produce a rapid speed RPM change (for example, upon acceleration from low to high speed). It is during such rapidly changing conditions that the internal combustion engine runs least efficiently and produces a lot of harmful exhaust emissions. By controlling the electric motor to "load balance" the internal combustion engine during these rapidly changing conditions, it is possible for the controller to control the internal combustion engine to operate in ways that might otherwise be unacceptable from a performance or other standpoint.

For example, the controller can supply the internal combustion engine with less fuel so it runs "leaner" during times when the electric motor is assisting the engine-increasing fuel economy and dramatically reducing harmful exhaust emissions. Even though the internal combustion engine operates very "lean", overall vehicle performance doesn't suffer (and can actually be improved) because the electric motor provides power assist to make up for decreased internal combustion engine torque output. The resulting power train operation is exceptionally smooth and powerful. The acceleration curve is rapid and continuous. Depending on the particular system characteristics and system design and operating criteria, acceleration performance can be improved dramatically relative to a non-hybrid system while improving fuel economy and lowering harmful exhaust gas emissions.

In one particular example, the controller may operate the electric motor as an electrical generator during times when the internal combustion engine produces (or the vehicle drive train otherwise has) more power than the vehicle needs. For example, during vehicle deceleration or regenerative braking and vehicle idle, the internal combustion engine produces excess power that can be used to recharge the batteries powering the electric motor. During such excess power conditions, the controller controls the electric motor to act as a generator to convert excess mechanical energy from the internal combustion engine to electrical energy. This electrical energy is used to recharge the electric battery.

The following is a non-exhaustive summary of further non-limiting features and advantages provided by the invention:

- Low emissions.
- Smooth, high performance operation.
- Simple, seamless, reliable design.
- Relatively low cost.
- Electrical assist mechanical balancing.
- Electric motor provides "load leveling" to satisfy peak and/or changing power demands due to acceleration and other rapidly changing conditions.
- Electric motor produces torque to overcome the need for the internal combustion engine to satisfy rapidly changing power demands—resulting in better fossil fuel economy and lower exhaust gas emissions
- Electrical assist may be sized to load level the internal combustion engine.
- Battery power provides enhanced lean running for higher energy efficiency even at idle.
- Internal combustion engine is directly connected to the electrical motor, and both are connected to the vehicle drive train.
- A seamless connection is made between the electric motor and internal combustion engine using grooved belts and gears.

No clutches are required.

No need for an energy storage flywheel.

Smooth torque control that varies from full power to zero power using an electrical assist computer.

Real time electrical assist computer operation can continually adjust motor and engine control parameters in response to sensed vehicle operating conditions—providing a fast response closed loop feedback control system.

Performance enhancement can be realized when both power sources are used.

Major charging can occur at the "sweet" spots of the engine where maximum internal combustion engine efficiency occurs. (The electrical battery power supply is charged on an ongoing basis, the internal combustion engine running in its "sweet spot" and the electric motor running as a generator to recharge the battery).

Utilize an electrical assist computer to monitor the functions of an internal combustion engine and, based on this information, the electrical assist computer gives appropriate commands to the electric motor.

Electrical assist computer can operate the electric motor in any of three different drive modes: drive, charge and neutral.

Modified Electronic Engine Management System can be used to monitor battery charge state and electric motor current and voltage, and to control the current delivered by the electric motor to charge the battery and used by the electric motor when assisting the engine.

The electrical motor is used for charging or producing power.

Battery charging at idle eliminates the problem of power waste at idle.

When the battery is fully or near fully charged, the electrical assist is used to reduce fuel consumption.

No relays or mechanical off-on switches are required for control except main power on-off using keys.

Electronically stored tables can be used to define the amount of current the motor uses to assist or charge, all over the engine operating range (Load vs. RPM). The amount can be derived empirically.

The Electrical Assist Computer modifies the charge current from zero to maximum as a function of the currently sensed state of charge.

Another possible mode is to have wall socket charging to obtain maximum power assist and fuel economy.

Not necessary to plug into wall socket to charge but this can be done for very high fuel economy.

Uses a battery with or without industrial capacitors. With capacitors in parallel the battery is balanced—reducing high demand or charge currents from damaging the battery and expanding the energy storage capacity.

Battery/motor weight and size can be selected to be about the weight and size of parts taken off the engine because they are not used, providing a negligible increase in overall vehicle weight (e.g., no more than a few pounds weight gain—75 lbs. on a 3,000 lb. car) after redundant parts are removed.

Using gasoline stored in tank extends the range of the vehicle many times over what could be obtained on electric power alone.

The electric motor can replace an alternator, generator, and, at the same time, is a traction motor.

The electric motor's output shaft can be directly coupled to the internal combustion engine's crankshaft.

A real-time computer-based electronic controller can be used to optimally control both the internal combustion engine and the electric motor.

The controller can monitor vehicle operating parameters in real time, and optimizes the electric motor's operation (and, if desired, also the operation of the internal combustion engine) to achieve desired operation characteristics including, but not limited to, maximal efficiency, best fuel economy, desired vehicle range, highest performance and/or lowest exhaust emissions.

The controller can provide very rapid real time response—making possible closed loop real time feedback control of the overall parallel hybrid motor/engine system.

The electric motor controller can phase the internal combustion engine and electric motor together so that pulse width pockets of power are applied at specific angled engine events even with a rapid speed and load change—providing a net effect of a smoother, cleaner and more efficient internal combustion engine.

The controller can operate the electric motor in neutral or "invisible" mode. This neutral mode can be used to prevent battery overcharging during times when electric motor power assist is not needed and/or to avoid further loading the internal combustion engine during less efficient engine operations.

BRIEF DESCRIPTION OF THE DRAWINGS

These and other features and advantages provided by this invention will be better and more completely understood by referring to the following detailed description of presently preferred example embodiments in conjunction with the drawings, of which:

FIG. 2 is a simplified block diagram of system 100;

FIG. 3 shows an example connection diagram for system 100;

DETAILED DESCRIPTION OF PRESENTLY PREFERRED EXAMPLE EMBODIMENTS

OVERALL OPERATION OF PREFERRED EMBODIMENT

Figure 1:
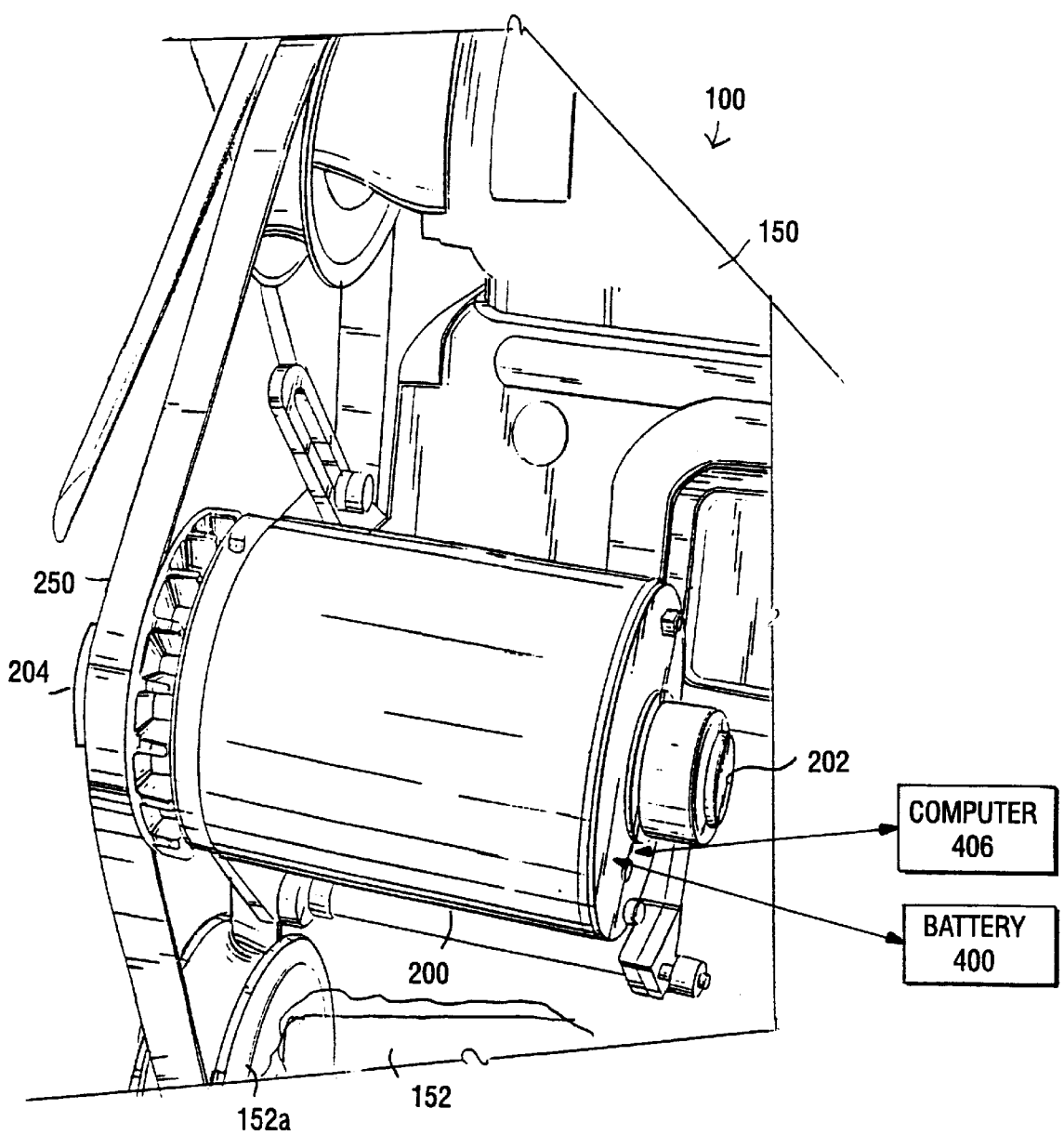
FIG. 1 shows an example parallel hybrid system 100 in which an electric motor and an internal combustion engine crankshaft are connected together in parallel using a serpentine drive belt.

FIG. 1 shows an example parallel hybrid vehicle power train arrangement 100. In this example, a motor vehicle such as, for example, a passenger car is powered by both a gasoline internal combustion engine 150 and an electric motor 200. Internal combustion engine 150 is a fossil fuel burning engine that produces noxious emissions. Electric motor 200 is a "clean" power plant that converts electric power stored in an electric motor power source 400 (e.g., a battery) to mechanical power.

In example system 100, the internal combustion engine 150 and electric motor 200 work together. System 100 provides an overall complementary system that matches the complementary strengths and weaknesses of electrical propulsion and fossil fuel propulsion to provide an overall power plant that performs significantly better than either an electric motor or an internal combustion engine alone.

In the FIG. 1 example "parallel hybrid" system, both the internal combustion engine 150 and the electric motor 200 are used as drive and load sensing devices to produce torque. Electric motor 200 is used to assist the internal combustion engine 150 at varying loads. The output of electric motor 200 reduces the load on the internal combustion engine and/or is used to augment the power of the internal combustion engine 150.

In more detail, the preferred embodiment example system 100 uses the electric motor 200 to provide a load leveling function that lowers the rate of change and the peaks and/or dips of the load on the internal combustion engine 150 so that the internal combustion engine loading is very close to the average of that load. This load leveling function increases the efficiency of internal combustion engine 150—providing better fuel economy and reducing emissions. An electrical assist computer 406 can be used to monitor engine sensors and battery information to perform calculations to determine the amount of assist or charge rate (see below).

In one particular example, electric motor 200 may be a relatively small electric motor (for example, 15–17 horsepower) used to "load level" a substantially larger internal combustion engine 150 (e.g., a 90 horsepower engine). Electric motor 200 is controlled to provide "power assist" at strategic points during the vehicle's operation so that the internal combustion engine 150 need not operate within high fuel consumption and/or high noxious exhaust gas output conditions.

Electric motor 200 uses power from the battery 400 when it is assisting internal combustion engine 150. Electric motor 200 could no longer assist engine 150 if the battery was allowed to completely discharge. In this preferred example, electric motor 200 charges the battery 400 during periods of light (or negative) loading of system 100. More specifically, during light or negative overall loading of system 100, electric motor 200 loads the internal combustion engine 150 and provides a light load charging function.

Light load charging can be regarded as being the "opposite" of electrical assist. When there is little load on the internal combustion engine 150, the electric motor 200 will load the internal combustion engine and produce a charging voltage back to the electric motor power source 400. In this example, the battery 400 or other electric motor power source sustains a state of charge within a few percent of the starting state of charge and can maintain that state of charge over many cycles.

Furthermore, a load applied to the drive system by electric motor produces a regenerative braking function. The regenerative braking function provides a charge voltage back to the electric motor power source, and reduces the need for friction braking to slow or stop the vehicle. Using regenerative braking, the force of gravity acting on the vehicle (e.g., as the vehicle goes down a hill) can be converted by electric motor 200 (acting as a generator) into electric current to recharge battery 400. This mode of operation has the advantage of not using up fossil fuel (e.g., gasoline) to recharge battery 400.

MORE DETAILED ENGINE/MOTOR CONNECTION ARRANGEMENT

In more detail, FIG. 1 shows a belt 250 that connects the internal combustion engine crankshaft 152 and the electric motor output shaft 202 in parallel. For example, electric motor shaft 202 may terminate in a pulley 204, and the internal combustion engine crankshaft 152 may terminate in a harmonic balancer 152a. Conventional brackets and other mounting structures may be used to mount motor 202 onto internal combustion engine 150 if desired. A serpentine belt 250 may directly couple the electric motor pulley 204 to the engine harmonic balancer 152a in a substantially non-slip manner so that the motor shaft 202 and engine crankshaft 152 rotate together.

The vehicle differential, transmission, and associated vehicle drive wheels are coupled to the engine crankshaft 152 through conventional means such as a drive shaft or other linkage (not shown). Rotation of engine crankshaft 152 is delivered to vehicle wheels. Rotation of electric motor shaft 202 causes (further) rotation of engine crankshaft 152—which, in turn, causes vehicles wheels to rotate. Thus, in this example, the internal combustion engine crankshaft 152 transmits torque from motor shaft 202 to the vehicle wheels.

Figure 1A:
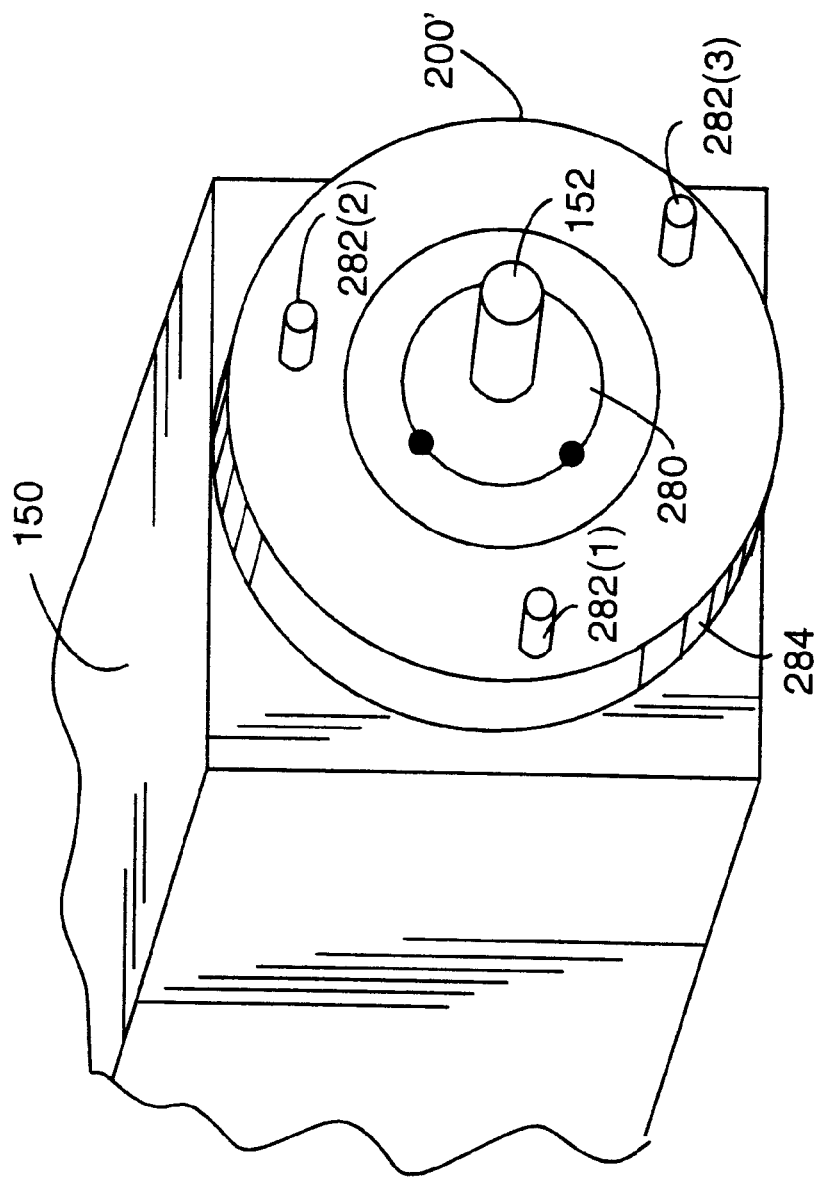
FIG. 1A shows an alternate embodiment using a pancake style electric motor directly coupled to the internal combustion engine crankshaft.

FIG. 1A shows an alternative example in which motor 200' is a "pancake" design that is directly coupled to the internal combustion engine crankshaft 152 without requiring a belt. In this example arrangement, the internal combustion engine crankshaft 152 is coupled to a rotor 280 of electric motor 200'. Mounting structures 282 are used to mount the motor stator 284 to engine 150. The FIG. 1A example has the advantage of providing an overall more compact design.

EXAMPLE BLOCK & SCHEMATIC DIAGRAMS

FIG. 2 shows an example simplified block diagram of system 100. In this example, internal combustion engine 150 interacts with electric motor 200 as described above. Battery 400 powers electric motor 200, and electrical assist computer 406 controls the electric motor based on internal combustion engine sensor 408 outputs and battery sensor 462 outputs.

Figure 2A:
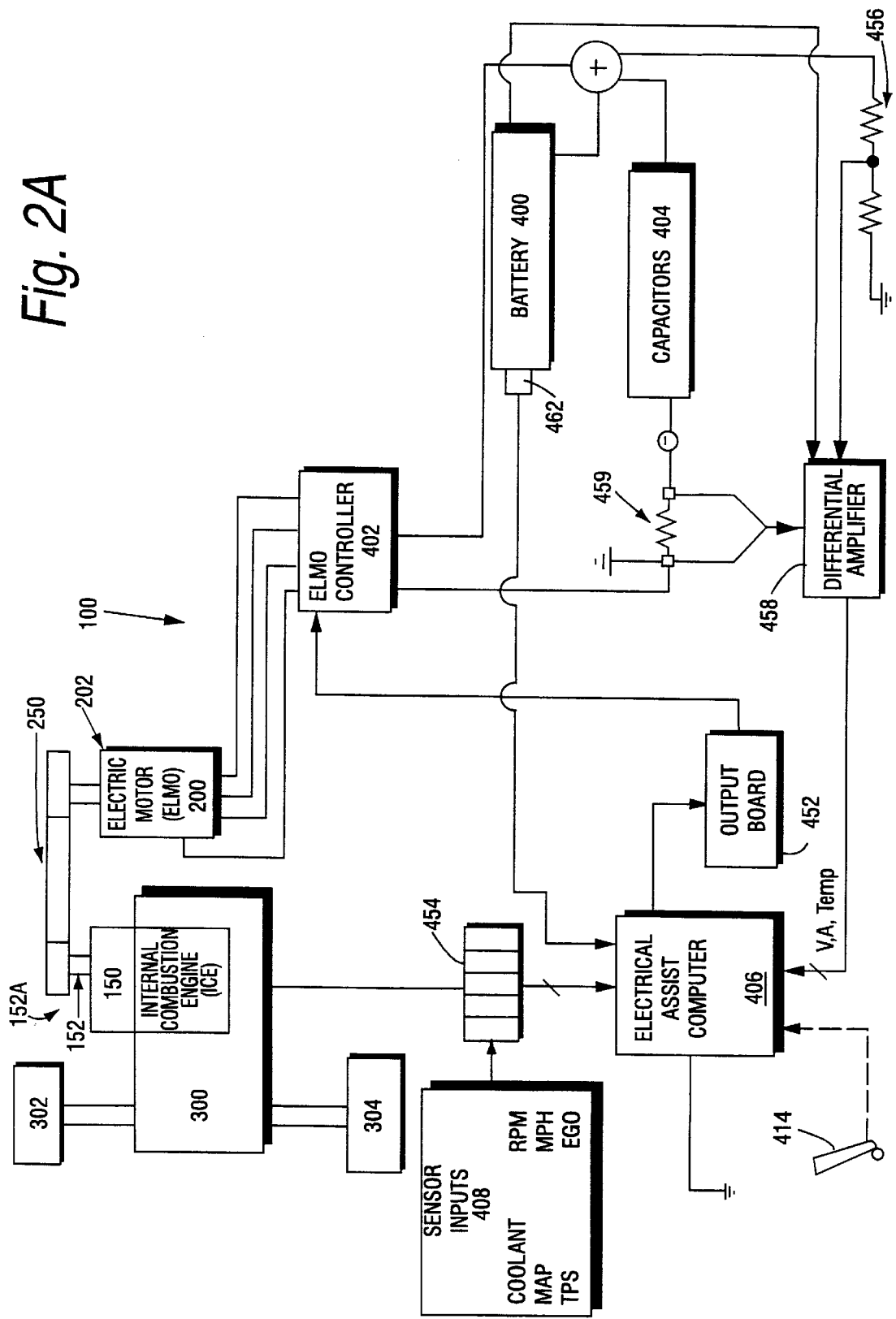
FIG. 2A is a more detailed schematic illustration of system 100.

FIG. 2A shows a more detailed example schematic diagram of system 100. In this example, internal combustion engine 150 delivers torque to vehicle wheels 302, 304 via a conventional transmission/drive train/differential 300. Electric motor 200 has an output shaft 202 that is coupled in parallel with the internal combustion engine output shaft 152 via a serpentine belt 250 or other suitable arrangement as described above.

Electric motor 200 is powered by electric batteries 400. An electric motor power controller 402 selectively couples electrical current from batteries 400 to electric motor 200. Electric motor power controller 402 provides power conductors and signal (control) conductors to electric motor 200. A capacitor bank 404 connected in parallel with electric batteries 400 is used to load balance the battery to provide higher transient currents for both charging and recharging. Batteries 400 and capacitor 404 together provide an energy storage means. This energy storage means uses both light weight high storage density batteries and existing industrial capacitors that reduce peak instant power draws the motor 200 required for acceleration, and reduce the high instant charge power that results when the motor 200 operates as a generator in a regenerative braking mode. The capacitors 404 increase the effective battery power and energy density, protect the batteries 400 from high power spikes, reduce the high currents as described above, and protect the batteries 400 from damage that can result from overheating—thus extending battery life.

A computer 406 controls and manages electric motor 200 and may also manage internal combustion engine 150 if desired. Computer 406 provides an electric motor control signal to power controller 402 via an output board 452. Power controller 402 in turn, provides drive current and voltage to electric motor 200. Electrical assist computer 406 pulse width modulates the electric motor controller 402 and electric motor 200 at specific engine events. The pulse width of the electric motor control signal can be advanced or retarded to best achieve the desired load leveling of the internal combustion engine 150.

Computer 406 receives engine sensor inputs 408 (e.g., manifold absolute pressure, engine crankshaft 152 speed, coolant temperature, exhaust gas parameters, vehicle speed, etc.) via an input board 454. In addition, computer 406 may monitor the voltage and charging current of battery 400 via voltage divider 456 and differential amplifier 458 respectively (the differential amplifier monitoring the voltage drop across shunt resistor 459 to indirectly measure charging current). Computer 406 may also receive a battery temperature signal from a temperature sensor 462 mounted in, on or near battery 400. Computer 406 may also monitor, directly or indirectly, the state of an ignition switch 412 and the position of an accelerator pedal 414.

In this example, computer 406 uses 3-D MAP tables based on its sensor and control inputs to generate the electric motor control signal. In addition, computer 406 may use similar 3-D MAP tables to determine spark advance and air/fuel ratio for internal combustion engine 150—and these tables can be compensated empirically for the effects of electric motor 200, the particular values within the electric motor tables, and the effects of the interaction between the motor and the engine. Computer 406 pulse width modulates the electric motor controller (and thus the electric motor) at specific engine events; the pulse width then can be advanced or retarded to best achieve the desired load leveling of the internal combustion engine 150.

In this example, electric motor 200 is a "brushless", switched magnet motor that uses switched pulse control to provide over one horsepower per pound of weight. Motor controller 402 controls current to motor 200 using solid state switches such as transistors that allow the power to modulate continuously from zero to maximum power, and to make the motor either produce mechanical power or produce electrical power to charge batteries 400. This allows arrangement 100 to flexibly provide a way to increase or decrease the amount of power assist provided by motor 200 (or to provide minimum power for operating in a neutral mode) without requiring any manual or mechanical electrical switches.

System 100 could be manufactured by an automobile manufacturer, or it can be retrofitted onto existing vehicles. For example, it is possible to provide a kit including motor 200, controller 402, batteries 400, capacitor 404 and computer 406. These components can be retro-fit installed on an already-manufactured vehicle at relatively low cost to provide increased performance, fuel economy and/or lower tailpipe emissions.

FIG. 3 is a more detailed connection diagram for connecting motor 200 and power controller 402 to overall system 100. In this example, battery 400 is connected to power controller 402 through a power switch 850, a fuse 852, and shunt 459. Controller 402 may provide an outboard display 856 indicating the presence of power, current limiting, regenerative braking, and direction of rotation status. The FIG. 3 example shows how discrete control inputs such as, for example, a throttle/accelerator pedal 414 voltage, a braking voltage from a braking control 858, a logic on/off switching control 860, and a hall effect clock input signal 862 may be used to control controller 402. For testing purposes, these various control inputs could be provided by a three-switch, two-potentiometer control box—but in the preferred embodiment most or all of these control signals are provided by computer 406.

Example Vehicle Operation

To operate system 100, a user may close an ignition switch 412 (for example, by turning the ignition key on the steering column of the vehicle). In response, computer 406 may control power controller 402 to deliver an appropriate amount of starting drive current to electric motor 200—operating the electric motor as a starting motor to start internal combustion engine 150. As the electric motor shaft 202 turns, belt 250 transmits the rotational energy to internal combustion engine crankshaft 152—causing the engine crankshaft to turn and the engine's pistons to move.

Once computer 406 detects that internal combustion engine 150 has started and is idling acceptably (e.g., by reading engine sensor inputs 408), the computer 406 may control power controller 402 to stop driving electric motor 200—and to instead begin operating the electric motor as a dc power generator. Rotational energy that would normally be wasted by the engine 150 during idling can be converted by electric motor 200 into electrical energy for recharging battery 400. Once the battery is fully charged (as computer 406 can sense by monitoring the battery current and voltage), the computer can begin operating electric motor 200 in a neutral mode—delivering just enough current to the electric motor so it appears to be a "zero load" to internal combustion engine 150.

Computer 406 senses an acceleration request when the vehicle driver puts his foot on accelerator pedal 414. In response, computer 406 may control electric motor 200 to immediately respond to the acceleration request by delivering output torque to its output shaft 202. Computer 406 thus controls electric motor 200 to assist internal combustion engine 150 during periods of rapidly changing power demands.

During this operation, batteries 400 supply electric motor 200 with power during times when computer 406 controls the electric motor to produce power output. Capacitor 404 in parallel with batteries 400 provides short term, low-impedance charge storage to meet high instantaneous current demands of electric motor 200. Capacitor 404 "load balances" batteries 400—providing high peak current delivery and absorption rates at a much lower internal resistance than batteries 400 provide.

Computer 406 continually monitors the state of batteries 400 during vehicle operation. If computer 406 determines that batteries 400 need to be charged, the computer controls electric motor 200 to begin operating in the generator mode. Since electric motor 200 is capable of charging batteries 400, there is no need for an additional alternator or generator. To prevent overcharging of batteries 400, computer 406 can operate electric motor in the neutral mode. In this neutral mode, computer 406 controls power controller 402 to deliver just enough current to electric motor 200 so that the electric motor shaft 202 rotates at exactly the same speed as the internal combustion engine 152. Because computer 406 exactly matches the electric motor 200 speed with the engine 150 rpm, the electric motor neither drains mechanical power from nor outputs mechanical power to the engine crankshaft 152. Rather, electric motor 200 in this neutral mode effectively disappears, from a load standpoint, with respect to the internal combustion engine 150. This neutral mode is useful during times when no power assist is desired (e.g., because of internal combustion engine 150 operating conditions and/or battery 400 charge state) and when it is undesirable to charge the battery (e.g., because battery charging would unduly load internal combustion engine 150, or because batteries 400 are already fully charged).

If computer 406 controls power controller 402 to provide slightly more current to electric motor 200 than is required for neutral mode to provide a slight overall power assist to internal combustion engine 150, we have found that it is possible under at least some engine operating conditions to operate the internal combustion engine at a much leaner air-to-fuel ratio than would otherwise be required for acceptable performance if electric motor 200 was not present.

Example Computer Operation

Figure 4:
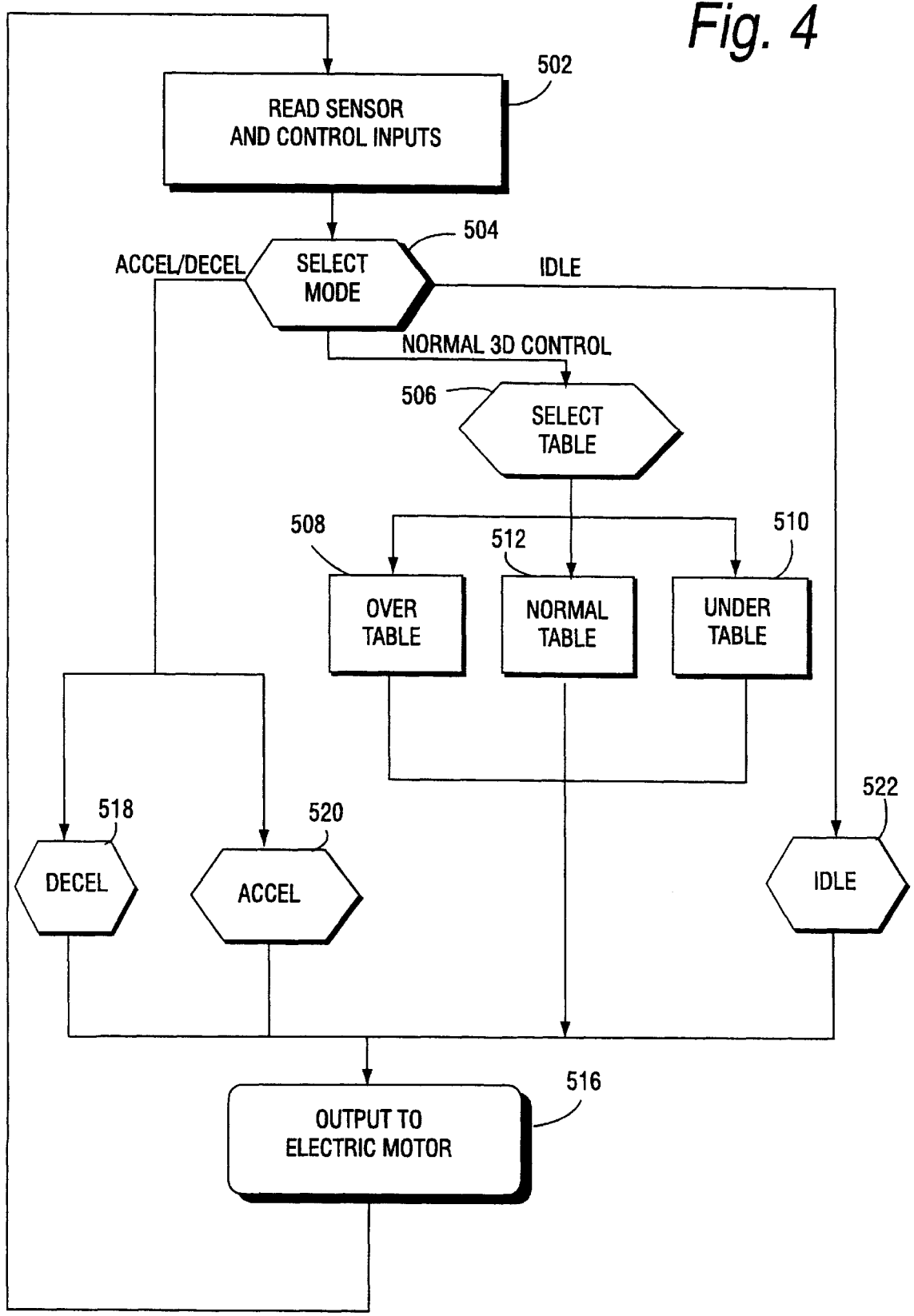
FIGS. 4 and 4A show flowcharts of example steps performed by the an example electronic controller.
Figure 4A:
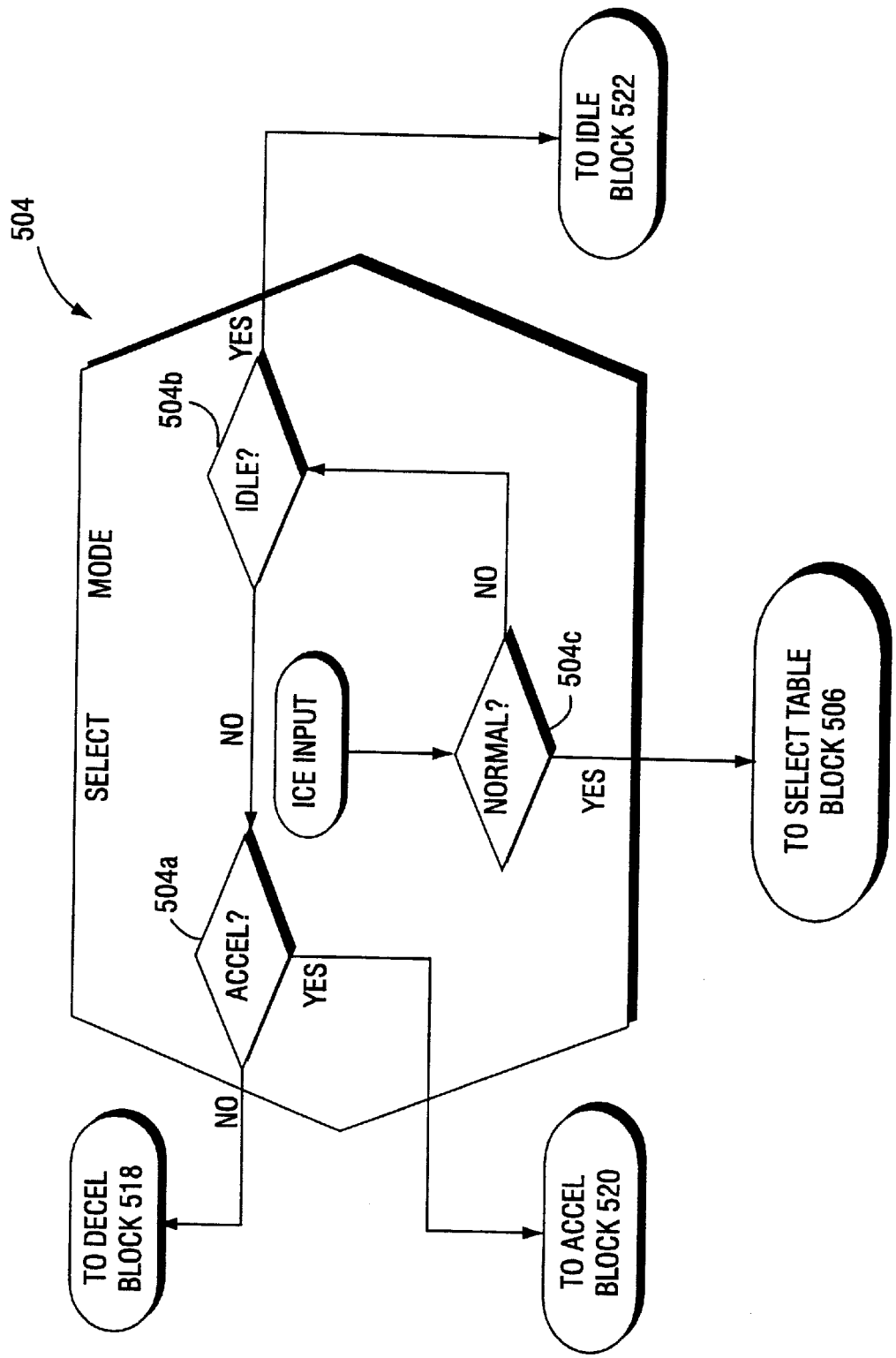

FIGS. 4 and 4A are flowcharts of example control steps performed by computer 406 during vehicle operation. The hybrid control program shown in FIG. 4 is a loop which controls both the internal combustion engine 150 and the electric motor 200 simultaneously by continuously interpreting sensor data 408 about internal combustion operation and the amount of power available to the electric motor.

The example hybrid control program has available to it (e.g., in a memory that is part of computer 406) programmable constants which define for the electric motor 200:

low battery condition,
normal charge range,
overcharge range,
undercharge range.

In addition, the FIG. 4 control program has available to it, stored three-dimensional operational tables used for these various ranges.

Beginning at the top of FIG. 4, computer 406 reads sensor inputs 408 and control inputs 414 as well as battery status inputs to determine the overall state of system 100—including battery charge state and the state of internal combustion engine 150 as described above (FIG. 4, block 502). Based on the control inputs, computer 406 determines whether system 100 should be operated in a special state (e.g., acceleration/deceleration or idle), or whether it should be operated in the normal 3-D control state (decision block 504, FIG. 4).

FIG. 4A is a more detailed view of the "select mode" decision 504. In FIG. 4A, the computer 406 reads the sensor inputs from internal combustion engine 150 and determines whether the engine is accelerating or decelerating (decision block 504*a*), at idle (decision block 504*b*), or in a "normal" operating range (decision block 504*c*). If the engine 150 is operating in its normal operating range, control proceeds to "select table" block 506 (FIG. 4). If the engine is not operating in its normal range, computer 406 determines whether the engine is at idle (FIG. 4A, decision block 504*b*); if so, control proceeds to "idle" block 522 (see FIG. 4). If the engine is not operating in its normal or idle ranges, then computer assumes that it is either accelerating or decelerating. If accelerating (FIG. 4A, "Yes" exit to decision block 504*a*), control is sent to "accel" block 520, FIG. 4. If the engine is decelerating (FIG. 4A, "No" exit to decision block 504*a*), control is to the "decel" block 518, FIG. 4.

Normal operations typically fall within the normal 3-D control mode ("normal 3-D control" exit to decision block 504, FIG. 4). In this normal 3-D control mode, computer 406 selects an appropriate 3-D control table from storage based on the charge state of batteries 400.

The vast majority of operations will be in the normal charge range. When an over charge is detected, computer 406 selects an overcharge table biased toward providing active assist from motor 200 (decision block 506, block 508, FIG. 4) to use up some battery power. When an undercharge of batteries 400 is detected, computer 406 selects a control table biased toward regeneration (decision block 506, block 510, FIG. 4) to help charge the batteries. In a rare case where extremely low battery condition is detected, computer 406 first attempts to correct the problem by full-time generation and, if no improvement is noted within a specific time period, the computer puts electric motor 200 into neutral and activates a trouble indicator.

In this example, computer 406 determines the state of the charge of batteries 400 by reading the battery voltage while measuring the instantaneous battery current—resulting in the value of the battery charge which is empirically plotted on a look up table to obtain the state of the charge of the battery. If batteries 400 are not over charged or under charged, computer 406 selects a "normal" table from which to look up control parameters (decision block 506, block 512).

Each of the over charge, under charge and normal look up tables is comprised of a three-dimensional map. These 3-D control tables accept engine speed and engine load as control inputs and provide motor 200 current as a control output. The tables may each contain sixty-four constants (in one example) representing internal combustion engine load, internal combustion engine rpm, and electric motor 200 control values. All electric motor 200 current control values stored in these tables are derived empirically in this example. They can be set to meet the energy needs throughout the engine operating range to achieve lower emissions, more fuel economy and/or special performance. The resulting electric motor control value is obtained by a dynamic interpolation of the apposite three constants.

Figure 5:
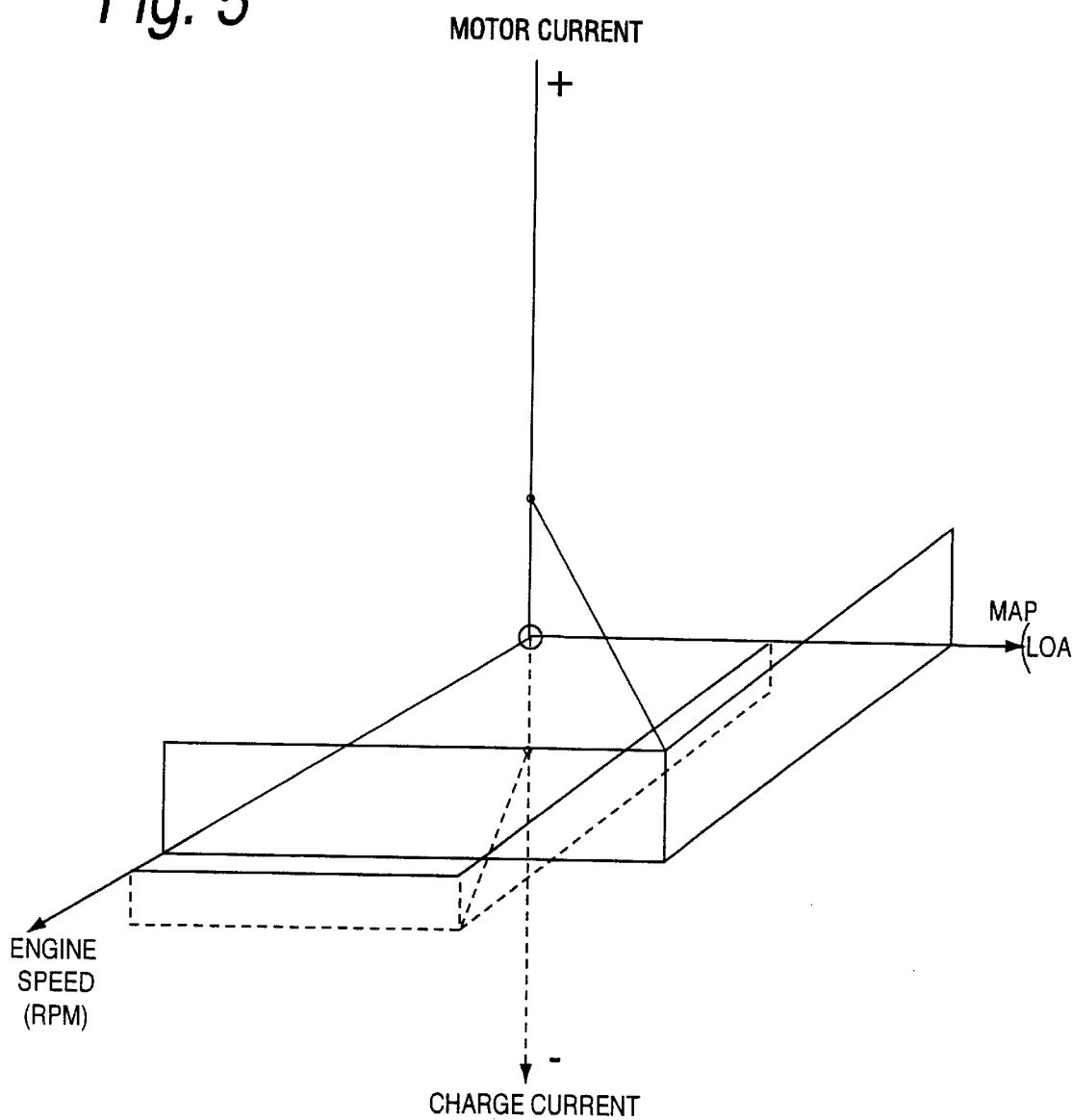
FIG. 5 shows an example three-dimensional control "map"

FIG. 5 shows an example 3-D charge mapping provided by the example look up tables. The example look up table maps the amount of electric motor 200 current in three dimensions—making motor current (a positive value for assist, a negative value for charging) a function of both manifold absolute pressure (MAP) and internal combustion engine crankshaft 152 rotational speed (rpm). Because internal combustion engine 150 is providing most of the output power most of the time to drive vehicle wheels 302, 304, the internal combustion engine manifold absolute pressure (MAP) is a relatively accurate indication of the overall load on the hybrid power plant 100.

FIG. 5 shows that motor current can be positive (in the case of using motor 200 to power assist) or it can be negative (in the case of using the motor regeneratively to charge batteries 400). For example, the FIG. 5 graph shows that when MAP (load) is high and engine speed (rpm) is high, electric motor 200 uses the reserves in batteries 400 to assist in propulsion. When load is low, electric motor 200 may begin operating regeneratively to recharge batteries 400.

In this example, computer 406 determines motor 200 current by looking this parameter up in one of the tables based on engine speed and load (FIG. 4, blocks 508, 512, 510). Computer 406 may interpolate between values if desired, and/or it may scale the values it obtains from the lookup process so the amounts can be made to vary as the battery charge level changes. The resulting value obtained from the lookup process may be outputted as a preprogrammed value of electric current for controlling electric motor 200 optimally throughout the entire operating range of internal combustion engine 150 (FIG. 4, block 516).

Because the FIG. 4 control program is a loop, each change in the electric motor 200 control value causes a change in the operation of internal combustion engine 150—which may in turn be sensed by computer 406 to provide modified control over the electric motor. The closed loop feedback control, properly managed, balances changes in electric motor 200 output against thermodynamic changes to the internal combustion engine 150, minimizes over correction and provides smooth and imperceptible transition from electric motor 200 neutral to "assist" or "regeneration" throughout the operating range of internal combustion engine 150. In this example, capacitors 404, electric motor 200 and power controller 402 work together to provide very rapid reaction times. This high speed reaction makes control smooth and sure.

Although 3-D tables could be used for deceleration, acceleration, and idle conditions, they are not necessary in this example since control of electric motor 200 is more straightforward under those conditions. For example, during deceleration (FIG. 4, block 518), computer 406 may control motor 200 to operate regeneratively in a charge mode (or in a neutral mode if the batteries 400 are fully charged) (FIG. 4, block 516). In an acceleration condition (FIG. 4, block 520), computer 406 provides current to electric motor 200 to provide power assist (FIG. 4, block 516). Under idle conditions (FIG. 4, block 522), computer 406 may control electric motor 200 to operate regeneratively or neutrally, depending on the charge state of batteries 400 (FIG. 4, block 516) and the leanness of the air/fuel ratio being delivered to internal combustion engine 150. In every case, the smoothness of power control is such that no roughness is detectable by the driver. All this contributes to smooth driveability and adds to the vehicle's power from the combination of internal combustion engine 150 and electric motor 200.

Thus, the combination of the power from the internal combustion engine 150 and electric motor 200 provides a means to propel the vehicle which is superior to either power source acting alone. This is because the control algorithm using an MAP sensor which acts to increase electric motor 200 power when the sensed load increases. This results in electric motor producing additional power as the sensed MAP value sees a pressure approaching atmospheric—indicating a load in the internal combustion engine 150 manifold. By using more electric power, the load on the internal combustion engine 150 is reduced. This reduces the power the internal combustion engine 150 must produce—saving fuel and making it easier to reduce tailpipe emissions—and also increasing driveability of the vehicle. These advantages are obtained when both power sources (internal combustion engine 150 and electric motor 200) act together in a constructive manner that is set into the computer 406 power coordinates (which, as described above, may be derived from empirical data).

Energy savings can be realized when the internal combustion engine 150 runs "lean" during electric assist by motor 200. Computer 406 can apply a small amount of electrical power to motor 200 to assist the internal combustion engine 150—allowing the internal combustion engine to resist stalling or erratic turning when the engine is running in an extremely lean condition.

In a further high performance example, internal combustion engine 150 could be a high power (e.g., 200 horsepower) engine, and a high power (e.g., 52 horsepower) electric motor could be used for motor 200. This high performance configuration would provide very fast, smooth acceleration while still allowing the motor to act as a generator to recharge the battery.

EXAMPLE TEST RESULTS

Experimental results of systems embodying the present invention provide excellent driveability. The feedback control allows electric motor 200 to load level the internal combustion engine 150 and provides smooth and imperceptible operation of vehicle. The system increased driveability and provided a very smooth driving vehicle. The "power assist" provided by electric motor 150 during acceleration was smooth, strong and peppy without providing any unexpected surges or other erratic results. Decreased emissions were realized by helping the engine run in a fashion which inherently minimizes emissions. By enhancing the production of power needed to make the car meet the demands of the driver, fuel economy was significantly enhanced. The batteries were charged when the internal combustion engine reached its sweet spot (where it is much more efficient) and the motor began operating as a generator.

In addition, experimental test results in the emissions lab have revealed substantial decreases in noxious emissions. Obviously, particular emissions results will depend upon a variety of different factors including but not limited to: engine starting temperature; air-fuel mixture; engine ignition and valve timing and tuning; catalytic converter action; engine speed, acceleration and deceleration; and other factors (as are well known to those skilled in this art). However, experiments have demonstrated substantially lower emissions and better fuel economy using the electrical assist features provided by our invention.

Figure 6A:
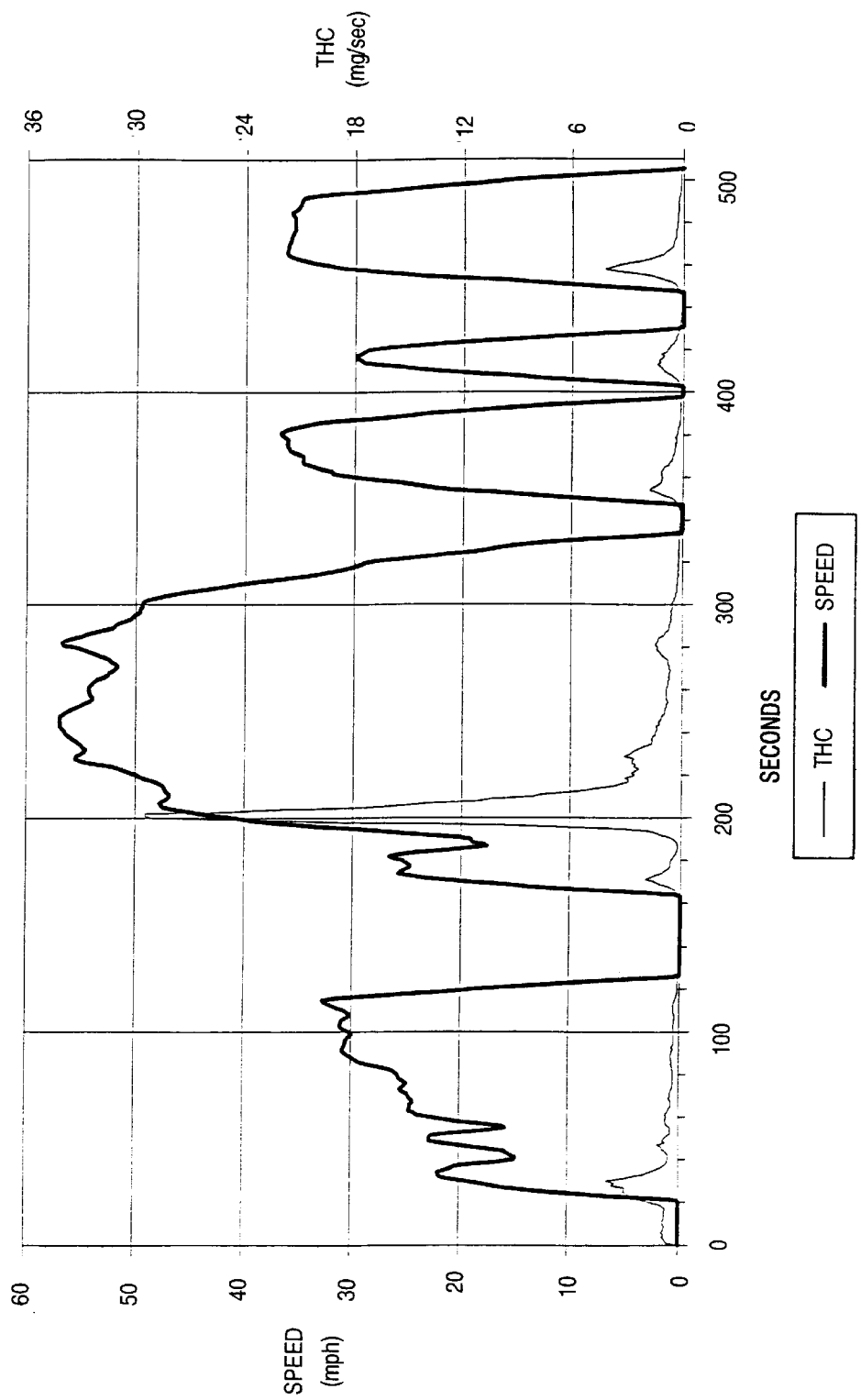
FIGS. 6A and 6B are graphs illustrating example comparative emissions test results.
Figure 6B:
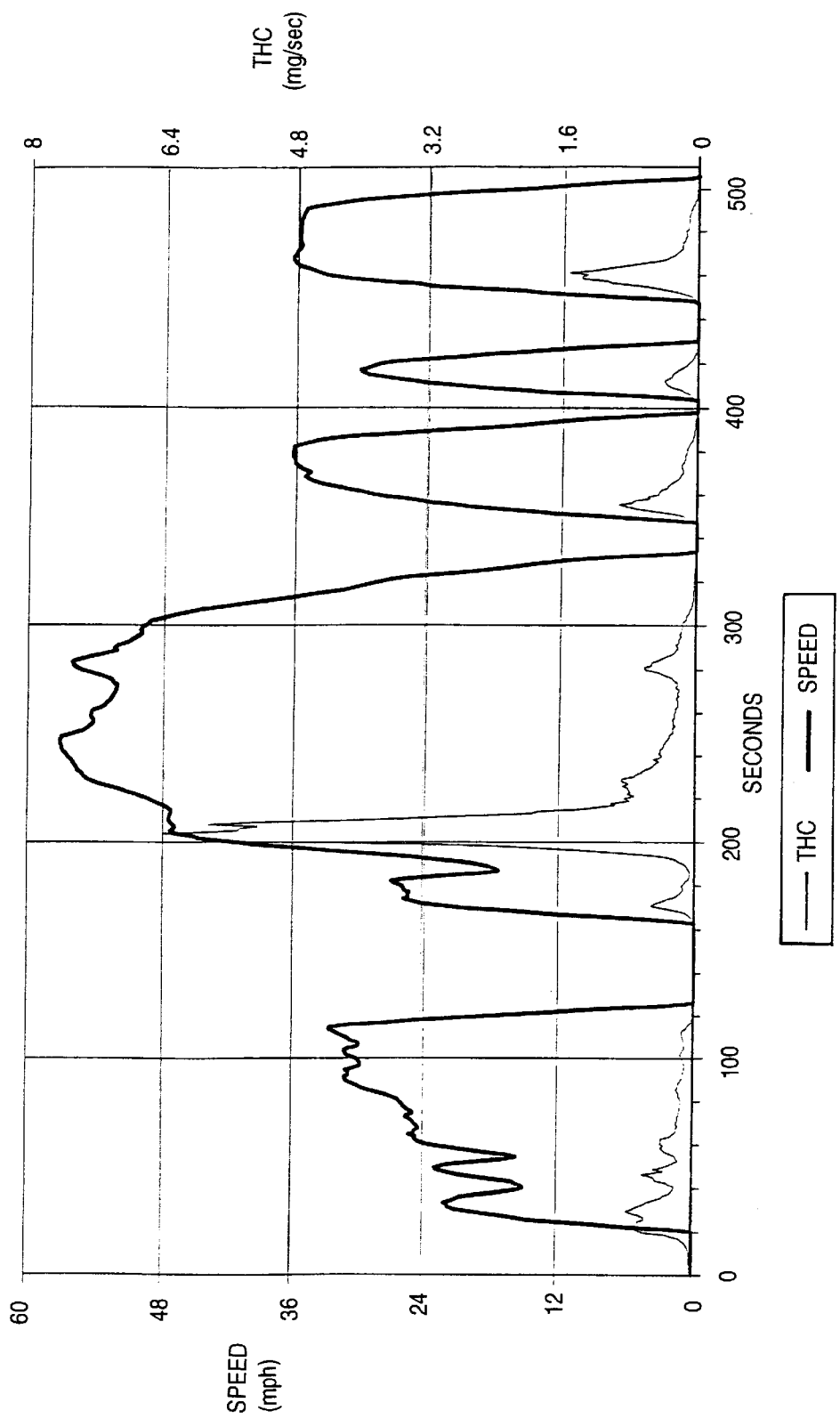

FIGS. 6A and 6B show one example comparison of internal combustion engine THC emissions (in milligrams per second) without electrical assist (FIG. 6A) and with electrical assist (FIG. 6B). These experimental results were measured in September 1997 by the EPA test lab in Springfield Va. The measurements were conducted on a 1993 Honda Civic modified to incorporate the present invention with the following characteristics:

Vehicle: 1993 Honda Civic VX.

Internal combustion engine 150: Honda Civic 1.5 liter "lean burn" four-cylinder, fuel injected distributorless 90 horsepower engine.

Electric motor: model DR127 brushless 15–17 horsepower "switched magnet" manufactured by Unique Mobility, Inc., Englewood, Colo.

Power controller 402: Model CR10-100 manufactured by Unique Mobility, Inc.

Batteries 400: YUSA (not liquid) lead-acid type connected to provide ninety-six volts (lithium ion type may be preferred for reduced weight), Computer 406: TEC total engine management/control system manufactured by Electromotive, Inc., Manassas, Va. modified to provide additional memory and further control inputs for dc current and voltage.

Capacitor 404: 1.5 Farads (while high voltages up to 100 VDC may be used efficiently, safety reasons dictate that relatively low voltages are used to prevent dangerous shocks to humans).

Other Vehicle Modifications: The alternator was removed to conserve weight—it is no longer needed.

The measurements were made on a "hot" system—i.e., one in which the internal combustion engine is at operating temperature at the beginning of the test.

The darker profiles in these two diagrams of FIGS. 6A and 6B represent substantially identical simulated vehicle speed contours (on a dynamometer) in miles per hour. This profile includes periods of rapid acceleration and rapid deceleration from 0 mph to nearly 60 mph over a period of about 8.5 minutes.

The lighter profile in each chart shows THC emissions in milligrams per second. While the THC emission profile in the FIG. 6A example without electrical assist appears somewhat similar to the THC emission profile in the FIG. 6B example using electrical assist, the THC emissions scales on the right-hand side of the two Figures are different. The FIG. 6A THC emissions scale is from 0–8 milligrams per second, while the FIG. 6B emissions scale is 4.5 times greater (0–36 milligrams per second).

For example, looking at the rapid acceleration from about 20 mph to about 55 mph 200 seconds into the test, the internal combustion engine emitted a peak of nearly 30 milligrams of THC per second without electrical assist (FIG. 6A) as compared with a peak of only about 6.4 milligrams of THC per second with electrical assist turned on (FIG. 6B). Thus, peak emissions without electrical assist were about 4.5 times higher than peak emissions with electrical assist under substantially the same test conditions.

The following test results provided by the EPA test lab illustrate reduced CO, Nox, HC and CO2 for the "hot" vehicle:

| Parameter | Electrical assist off | Electrical assist on | Improvement |
|---|---|---|---|
| CO (g/mi) | 1.675 | 0.309 | 81.5% |
| Nox (g/mi) | 0.854 | 0.581 | 32% |
| HC (g/mi) | 0.18 | 0.059 | 67% |
| CO2 (g/mi) | 177.7 | 148.3 | 16.5% |
| Fuel economy (mpg) | 49.1 | 59.8 | 22% |

These tests were performed by the same bench operator and same driver on the same day under the following test conditions:

| Parameter | Electrical Assist Off | Electrical Assist On |
|---|---|---|
| vehicle | Modified 1993 Honda Civic, engine at operating temperature | Same |
| Barometer (in. Hg) | 29.811 | same within 0.01 inches |
| Dew Pt. (° F.) | 59.971 | same within 0.1 degree |
| Ambient Temp. (° F.) | 75.576 | same within 0.1 degree |
| Humidity (gr/lb) | 77.383 | 77.630 |
| Vmix (scf) | 2843.9 | 2840.9 |
| Dyno Roll Revs. | 8406 | 8415 |
| Nox Hum. Corr. | 1.0113 | 1.0125 |

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A hybrid motor vehicle power plant arrangement comprising:
    an internal combustion engine having an internal combustion engine output shaft;
    an electric motor having an electric motor output shaft;
    a coupling arrangement that couples the electric motor output shaft to the internal combustion engine output shaft; and
    an electronic controller connected to electronically control the internal combustion engine and the electric motor,
    wherein the electric controller controls the electric motor to provide a positive or negative loading to the internal combustion engine output shaft, and at least sometimes operates the electric motor in a mode that allows the electric motor to remain mechanically coupled to the internal combustion engine through the coupling arrangement while minimizing loading of the internal combustion engine output shaft by the electric motor, by controlling electric current to the electric motor so that the electric motor output shaft rotates at substantially the same speed as the internal combustion engine output shaft.

2. An arrangement as in claim 1 wherein the electric motor is coupled in parallel with the internal combustion engine.

3. An arrangement as in claim 1 wherein the electronic controller monitors parameters relating to the operation of at least the internal combustion engine, and provides an electric motor control signal to control the electric motor.

4. An arrangement as in claim 3 wherein the electronic controller is connected in a closed loop configuration.

5. An arrangement as in claim 1 wherein the internal combustion engine output shaft comprises a crankshaft, and the electric motor output shaft comprises a rotor.

6. An arrangement as in claim 5 wherein the coupling arrangement includes a serpentine belt.

7. An arrangement as in claim 1 wherein the internal combustion engine output shaft comprises a crankshaft, and the electric motor output shaft comprises a disk mounted to the internal combustion engine, the disk being coupled to the crankshaft.

8. An arrangement as in claim 1 further including an electric power storage device coupled to the electric motor, the electric motor sometimes operating in a charging mode to charge the electric power storage device.

9. An arrangement as in claim 8 wherein the electric motor charges the electric power storage device by converting torque generated by the internal combustion engine to electric energy during times when loading on the internal combustion engine is light.

10. An arrangement as in claim 8 wherein the electric motor charges the electric power storage device through regenerative braking.

11. An arrangement as in claim 8 wherein the electric power storage device comprises a battery.

12. An arrangement as in claim 8 wherein the electric power storage device includes a large capacitor.

13. An arrangement as in claim 1 wherein the electronic controller effectively lowers the rate of change of internal combustion engine loading so maximum and minimum internal combustion engine loads are closer to average internal combustion engine load.

14. An arrangement as in claim 1 wherein the electric motor provides a maximum torque output less than half the internal combustion engine maximum torque output.

15. An arrangement as in claim 14 wherein the electric motor provides a maximum torque output that is in the range of ⅙ to ½ the internal combustion engine maximum torque output.

16. An arrangement as in claim 1 wherein the electronic controller allows the internal combustion engine to run with a leaner air-fuel ratio while maintaining acceptable driveability.

17. An arrangement as in claim 1 wherein the electronic controller pulse width modulates the electric motor at specific events associated with the internal combustion engine, the electronic controller changing the advance or retard timing of the pulse width modulation to achieve a desired load leveling effect of the internal combustion engine.

18. A hybrid power source including an internal combustion engine having an internal combustion engine output shaft and an electric motor having an electric motor output shaft, the internal combustion engine output shaft and the electric motor output shaft being connected in parallel via a coupling arrangement, the hybrid power source further including an electric controller connected to electronically control the internal combustion engine and the electric motor, wherein the electric controller monitors a load imposed upon the internal combustion engine output shaft and controls the electric motor to level an effective loading of the internal combustion engine output shaft and provide better fuel efficiency and reduce harmful emissions from the internal combustion engine, and wherein the electric controller at least sometimes operates the electric motor in a mode that allows the electric motor to remain mechanically coupled to the internal combustion engine through the coupling arrangement while minimizing loading of the internal combustion engine output shaft by the electric motor, by controlling electric current to the electric motor so that the electric motor output shaft rotates at substantially the same speed as the internal combustion engine output shaft.

19. A hybrid power source as in claim 18 wherein the electric controller pulse width modulates the electric motor at specific events associated with the internal combustion engine, the electric controller changing the advance or retard timing of the pulse width modulation to achieve a desired load leveling effect of the internal combustion engine.

20. A method of operating a hybrid power plant including an electric motor providing a torque output coupled to a torque output of an internal combustion engine, the method including the steps of electronically controlling the electric motor to provide a positive or negative loading to an output shaft of the electric motor, and at least sometimes operating the electric motor in a mode that allows the electric motor to remain mechanically coupled to an output shaft of the internal combustion engine through a coupling mechanism while minimizing loading of the output shaft of the internal combustion engine by the electric motor, by controlling electric current to the electric motor so that the electric motor output shaft rotates at substantially the same speed as the internal combustion engine output shaft.

21. A method as in claim 20 further including the steps of pulse width modulating the electric motor at specific events associated with the internal combustion engine, and changing the advance or retard timing of the pulse width modulation to achieve a desired load leveling effect of the internal combustion engine.

22. A method as in claim 20 further including the step of coupling the electric motor torque output in parallel with the internal combustion engine torque output.

23. A method as in claim 23 further including the step of continually electronically monitoring parameters relating to the operation of at least the internal combustion engine, and providing a responsive electric motor control signal to control the electric motor.

24. A method as in claim 20 further including the step of controlling using closed loop feedback to control the electric motor.

25. A method as in claim 20 wherein the internal combustion engine has a crankshaft, the electric motor has a rotor, and the method further includes the step of coupling the crankshaft and the rotor so that they turn together.

26. A method as in claim 20 further including the step of sometimes operating the electric motor in a charging mode to charge the electric power storage device.

27. A method as in claim 26 wherein the charging mode operating step includes sensing when loading on the internal combustion engine is light, and using the electric motor to convert torque generated by the internal combustion engine to electric energy during times when the sensing step senses that the loading on the internal combustion engine is light.

28. A method as in claim 26 wherein the charging mode operating step includes using the electric motor as a regenerative brake.

29. A method as in claim 20 further including the step of storing electric power in a large capacitor.

30. A method as in claim 20 further including the step of electronically controlling the electric motor to effectively lower the rate of change of internal combustion engine loading so maximum and minimum internal combustion engine loads are closer to average internal combustion engine load.

31. A method as in claim 20 including the step of outputting, from the electric motor, a maximum torque less than half the internal combustion engine maximum torque output.

32. A method as in claim 31 including the step of outputting, from the electric motor, a maximum torque output that is in the range of ⅙ to ½ the internal combustion engine maximum torque output.

33. A method as in claim 20 including the step of operating the internal combustion engine with a lean air-fuel ratio and supplementing the internal combustion engine power output and thereby maintain acceptable driveability.

* * * * *